US011958239B2

(12) United States Patent
Ramirez Muela et al.

(10) Patent No.: US 11,958,239 B2
(45) Date of Patent: Apr. 16, 2024

(54) THREE-DIMENSIONAL OBJECT PRODUCTION (71) Applicant: Hewlett-Packard Development Company, L.P., Houston, TX (US)

(72) Inventors: David Ramirez Muela, Barcelona (ES); Lihua Zhao, Sunnyvale, CA (US); Alejandro Manuel De Pena, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 15/565,871

(22) PCT Filed: Jul. 30, 2015

(86) PCT No.: PCT/US2015/042987
§ 371 (c)(1),
(2) Date: Oct. 11, 2017

(87) PCT Pub. No.: WO2017/019102
PCT Pub. Date: Feb. 2, 2017

(65) Prior Publication Data
US 2018/0133957 A1    May 17, 2018

(51) Int. Cl.
*B29C 64/165* (2017.01)
*B33Y 30/00* (2015.01)
(Continued)

(52) U.S. Cl.
CPC .......... *B29C 64/165* (2017.08); *B22F 10/28* (2021.01); *B22F 12/17* (2021.01); *B29C 64/20* (2017.08);
(Continued)

(58) Field of Classification Search
None
See application file for complete search history.

(56) References Cited

U.S. PATENT DOCUMENTS

| 8,933,148 B2 | 1/2015 | Derry et al. |
| 2006/0180957 A1 | 8/2006 | Hopkinson et al. |

(Continued)

FOREIGN PATENT DOCUMENTS

| CN | 103842157 A | 6/2014 |
| CN | 104290322 | 1/2015 |

(Continued)

OTHER PUBLICATIONS

International Search Report and Written Opinion dated Apr. 29, 2016, PCT Patent Application No. PCT/US2015/042987, filed Jul. 30, 2015, Korean Intellectual Property Office.

(Continued)

*Primary Examiner* — Farah Taufiq
(74) *Attorney, Agent, or Firm* — SHOOK, HARDY & BACON L.L.P.

(57) ABSTRACT

Apparatus to produce a three-dimensional object and methods of producing a three-dimensional object are described. In some examples, a first fluid comprising a colorant and a second fluid comprising an absorber to absorb electromagnetic radiation are applied on a layer of particulate material. Application of the second fluid to the layer of particulate material is in dependence on an ability of the first fluid to absorb the electromagnetic radiation.

9 Claims, 8 Drawing Sheets (51) Int. Cl.
| | |
|---|---|
| *B29C 64/20* | (2017.01) |
| *B33Y 50/02* | (2015.01) |
| *B33Y 70/00* | (2020.01) |
| *B22F 10/28* | (2021.01) |
| *B22F 12/17* | (2021.01) |
| *B33Y 10/00* | (2015.01) |
| *B22F 10/73* | (2021.01) |
| *B22F 12/41* | (2021.01) |
| *B22F 12/60* | (2021.01) |

(52) U.S. Cl.
CPC ............... *B33Y 30/00* (2014.12); *B33Y 70/00* (2014.12); *B22F 10/73* (2021.01); *B22F 12/41* (2021.01); *B22F 12/60* (2021.01); *B33Y 10/00* (2014.12); *B33Y 50/02* (2014.12); *Y02P 10/25* (2015.11)

(56) References Cited

U.S. PATENT DOCUMENTS

| | | | |
|---|---|---|---|
| 2007/0241482 A1* | 10/2007 | Giller | B29C 64/165 264/494 |
| 2009/0017220 A1 | 1/2009 | Muller et al. | |
| 2013/0287933 A1 | 10/2013 | Kaiser et al. | |
| 2014/0134334 A1 | 5/2014 | Pridoehl et al. | |
| 2014/0314613 A1* | 10/2014 | Hopkinson | B33Y 40/00 419/55 |
| 2015/0024319 A1* | 1/2015 | Martin | G03G 9/0819 430/108.22 |

FOREIGN PATENT DOCUMENTS

| | | |
|---|---|---|
| GB | 2493398 A | 2/2013 |
| WO | WO-2015106844 A1 | 7/2015 |
| WO | WO-2015108543 | 7/2015 |
| WO | WO-2015108546 | 7/2015 |

OTHER PUBLICATIONS

Z Corporation, "Z Corporation 3D Printing Technology", Apr. 5, 2007, pp. 7. Http://www.zcorp.com/documents/108_3d%20printing%20white%20paper%20final.pdf.

Handbook of Plastic Processing Applications, Edited by Li Zude, China, Material Press, Oct. 1997, 1st Printing, 1st Edition, pp. 1278-1280.

* cited by examiner

THREE-DIMENSIONAL OBJECT PRODUCTION

CLAIM FOR PRIORITY

The present application is a national stage filing under 35 U.S.C. § 371 of PCT application number PCT/US2015/042987, having an international filing date of Jul. 30, 2015, the disclosure of which is hereby incorporated by reference in its entirety.

BACKGROUND

Apparatus that generate three-dimensional objects, including those commonly referred to as "3D printers", have been proposed as a potentially convenient way to produce three-dimensional objects. These apparatus typically receive a definition of the three-dimensional object in the form of an object model. This object model is processed to instruct the apparatus to produce the object using a production material or plural production materials. This may be performed on a layer-by-layer basis. The processing of the object model may vary based on the type of apparatus and/or the production technology being implemented. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In the production of three-dimensional objects, e.g. in so-called "3D printing", there is a challenge to control the structure of generated objects. For example, it may be desired to produce objects with a variety of mechanical properties, which may influence, or be influenced by, material properties of a produced object. It is also desirable to control the color of produced objects. In certain cases, it may be desired to vary the color of at least one part of an object without affecting the mechanical properties of the object, or to vary the mechanical properties of part of an object without affecting a color of the object. Such considerations are not present with two-dimensional printing.

Certain examples described herein facilitate a three-dimensional object with a desired structure to be produced in a printing operation.

Figure 1:
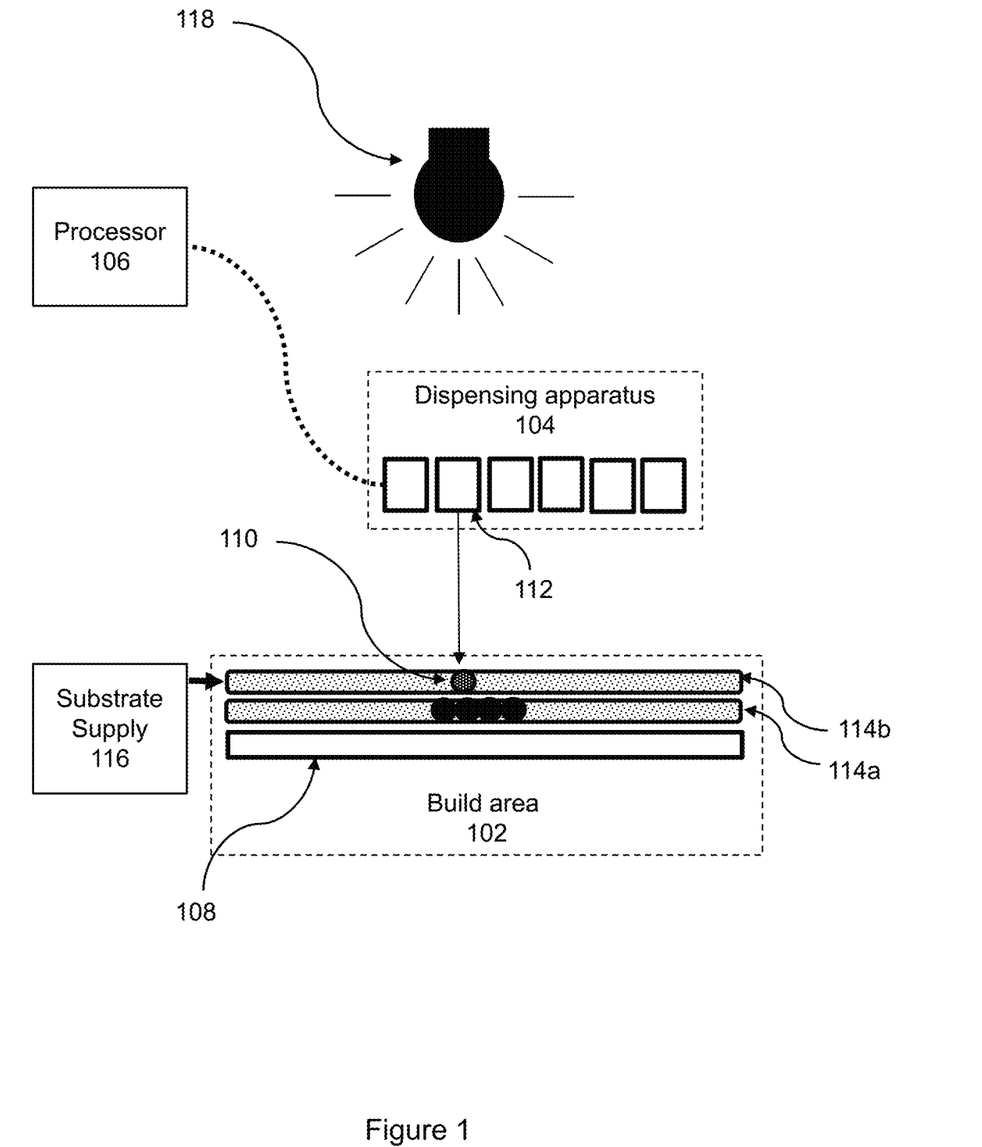
FIG. 1 is a schematic diagram of an apparatus to produce a three-dimensional object according to an example.

An example of an apparatus to produce a three-dimensional object will now be described with reference to FIG. 1. FIG. 1 shows an example of an apparatus 100 to produce a three-dimensional object 110. The apparatus 100 may comprise a so-called "3D printer". The apparatus 100 comprises a build area 102, a dispensing apparatus 104, and a processor (referred to hereinafter as a controller) 106.

The build area 102 may comprise a platen 108 upon which a three-dimensional object 110 may be constructed.

The dispensing apparatus 104 is to dispense, deposit, or otherwise apply a plurality of materials to generate the three-dimensional object 110. Examples of these materials are discussed in more detail below. The materials may comprise, for example, clear and/or colored agents (such as fusing or coalescing agents) for use on a substrate.

In FIG. 1, the dispensing apparatus 104 is communicatively coupled to the processor 106, e.g. via a wired interface and/or via a wireless interface. The processor 106 may be programmed to control the dispensing apparatus 104 based on manufacturing control data. The manufacturing control data may indicate placement instructions for the plurality of materials. For example, these instructions may comprise firing signals for at least one print head 112 to deposit a particular material. These firing signals may be associated with a particular location in two or three dimensional space.

The dispensing apparatus 104 may be moveable relative to the platen 108 in order to deposit a material at a particular location. The three-dimensional object 110 may be constructed layer-by-layer, in which case the dispensing apparatus 104 may deposit material onto each layer. In this case, placement instructions may relate to the placement of an available material or material combination at a particular print-resolution pixel for a particular layer (e.g. to deposit a material composition for a voxel associated with the layer).

The dispensing apparatus 104 may in certain examples comprise an inkjet deposit mechanism. In the example of FIG. 1, the apparatus is to print a plurality of liquid agents onto layers of a powdered substrate 114. The powdered substrate is a particulate material. In some examples, the dispensing apparatus 104 may comprise first and second dispensers. In this example, the dispensing apparatus 104 comprises six inkjet print heads 112. Each inkjet print head 112 may be adapted to deposit an agent onto the substrate 114. In particular, each inkjet print head 112 may be to deposit a particular agent upon defined areas of a plurality of successive layers of the substrate 114. An agent may act as a fusing agent or as a fusing inhibitor. The latter may cause a "blank" or "empty" material composition to be created.

In FIG. 1, the apparatus 100 comprises a substrate supply mechanism 116 to supply at least one substrate layer onto which the plurality of materials may be dispensed, deposited or otherwise applied by the dispensing apparatus 104. In this example, the substrate supply mechanism 116 comprises a powdered substrate supply mechanism to supply successive layers of powdered substrate 114. Two layers are shown in FIG. 1: a first layer 114a onto which a second layer 114b has been deposited by the substrate supply mechanism 116. In certain cases, the substrate supply mechanism 116 is to move relative to the platen 108 so that successive layers may be deposited on top of each other.

In the present example, the apparatus also comprises a fuser 118 to apply energy to form portions of the three-dimensional object from the powdered substrate 114. For example, FIG. 1 shows a particular print head 114 depositing a controlled amount of a fluid agent onto an addressable area of the second layer of powdered substrate 114*b*. The fluid agent is deposited onto the powdered substrate and, as such, a drop of agent on an addressable area unit of the layer relates to a print resolution voxel. The height of the voxel is determined by the depth of each layer of substrate 114. The placement instructions discussed above may control the operation of the print head 112 to form the voxel. Following application of the agent, the fuser 118 is to fix or solidify the portion of the layer of substrate 114*b*. For example, the fuser 118 may apply electromagnetic radiation within a wavelength range to the layer of substrate 114*b*. The application of electromagnetic radiation may melt, sinter or fuse the material of the layer of substrate 114*b*, as described below with reference to FIG. 2. In certain examples, the fuser 118 may comprise an energy source such as a ultra-violet or infra-red light source, e.g. a lamp or laser. FIG. 1 shows four print resolution voxels that have been fixed in the first layer 114*a*. As such, a voxel in the second layer 114*b* may be built on voxels formed in the first layer 114*a* to build the three dimensional object. Lower layers of the substrate 114 may also provide support for overhanging fixed portions of a three-dimensional object, so that the substrate may be removed at the end of production to reveal the completed object.

In the example shown in FIG. 1, there may be six agents, with each agent relating to a different property. For example, four of the agents may comprise colorants to provide a full color space for producing three-dimensional objects. One of the agents may be a substantially colorless, or neutrally-colored, electromagnetic radiation absorbing agent. One of the agents may be a detailing agent to cool the substrate or otherwise prevent fusion of the particulate material of the substrate.

The processor 106 may control the dispensing, deposition or application of the different agents in accordance with the placement instructions. In certain examples, the placement instructions may specify colors to be formed in various portions of the three-dimensional object 110. The processor 106 may determine the relative amounts of different colorants to achieve the specified colors. The desired color and/or optical density of a voxel may be adjusted by varying the amount of colorant(s) in the voxel.

In some examples, the processor 106 may determine an amount of substantially colorless or neutrally-colored absorber to apply to a given voxel. The quantity of colorless or neutrally-colored absorber may be determined as described below. Control of the amount of colorless or neutrally-colored absorber may facilitate the formation of a multi-colored three-dimensional object 110 with mechanical properties that are substantially uniform throughout the object. That is, the mechanical properties may not be color dependent. Alternatively or additionally, control of the amount of colorless or neutrally-colored absorber may facilitate variation in the mechanical properties of a colored three-dimensional object 110. That is, different portions of the object 110 may have different respective mechanical properties.

More generally, the apparatus 100 is to apply a first fluid on a layer of particulate material. The first fluid comprises a colorant. The apparatus is also to apply a second fluid on the layer of particulate material. The second fluid comprises an absorber to absorb electromagnetic radiation. The apparatus is to apply the second fluid to the layer of particulate material in dependence on an ability of the first fluid to absorb the electromagnetic radiation.

The apparatus may comprise a dispensing apparatus to dispense the first fluid and the second fluid on a layer of particulate material. The apparatus may comprise a processor to control the dispensing apparatus to dispense the second fluid on the basis of an electromagnetic radiation absorption characteristic of the first fluid.

In some examples, the fluids may be applied directly on the layer of particulate material. In other examples, the fluids may be applied indirectly on the particulate matter; for example, one fluid may be applied on a previously-applied fluid without contacting the layer of particulate material.

In some examples, a quantity or volume of the second fluid to be applied may be dependent on the ability of the first fluid to absorb the electromagnetic radiation. In other examples, the second fluid may be selected from a plurality of fluids that have different respective electromagnetic absorption characteristics, dependent on the ability of the first fluid to absorb the electromagnetic radiation. In some examples, the ability of the first fluid to absorb electromagnetic radiation may be known or determined based on an absorption characteristic of the first fluid, such as an absorption spectrum.

Figure 2:
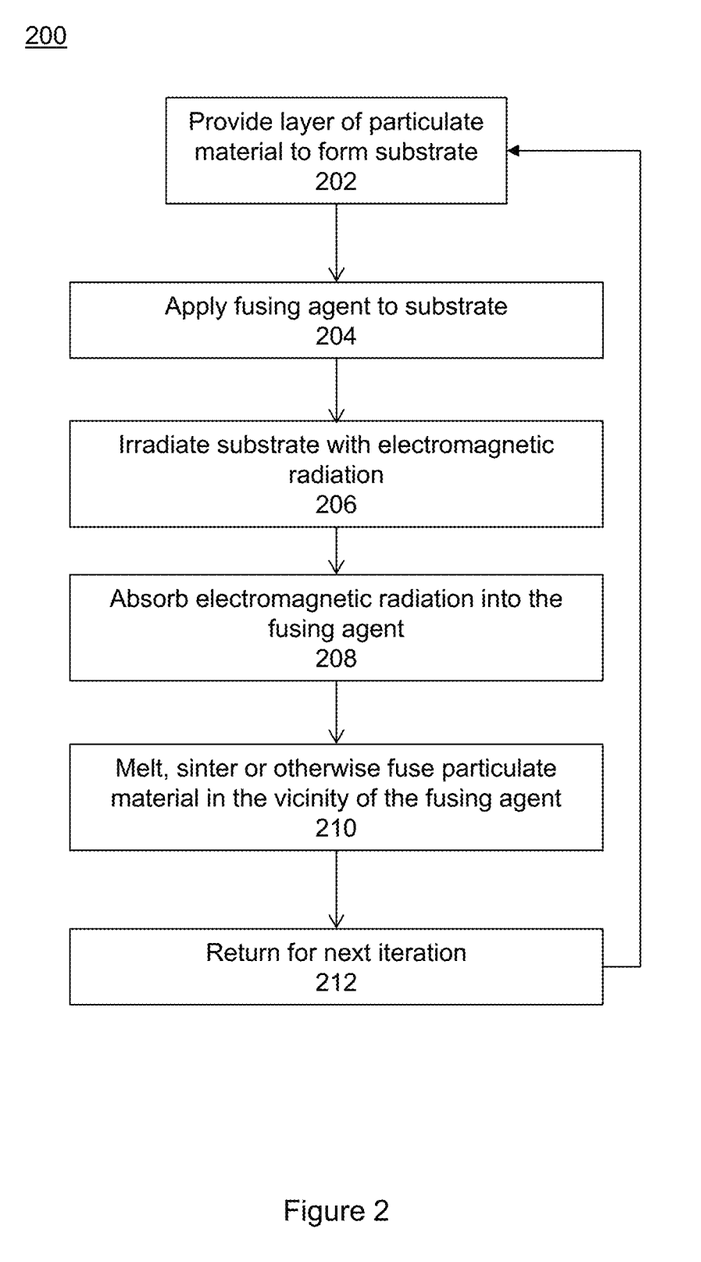
FIG. 2 is a flow diagram showing a method of producing a three-dimensional object according to an example.

FIG. 2 shows a method 200 by which an apparatus such as the apparatus 100 shown in FIG. 1 may produce a three-dimensional object 110.

At block 202, a layer of particulate material is provided. The layer of particulate material is a first layer of substrate 114*a*. The particulate material may be chosen so that it absorbs electromagnetic energy that is within a range of wavelengths of electromagnetic energy emitted by the fuser 118.

The layer of particulate material may in some examples be between 60 and 300 microns thick. In some examples, the layer of particulate material may be made uniformly, or substantially uniformly, thick using a roller. In other examples, the layer of particulate material may be made uniformly, or substantially uniformly, thick using a wiper.

At block 204, a fusing agent is applied to the substrate 114. The fusing agent may be selectively applied to portions of the substrate 114 that are to be solidified to produce the three-dimensional object 110. The fusing agent may comprise an absorber to absorb electromagnetic radiation in the range of wavelengths of electromagnetic radiation emitted by the fuser 118. A path description for the print head assembly may be contained in the placement instructions, which may be generated by a path generator system.

At block 206, the fuser 118 may emit electromagnetic radiation so that the substrate may be irradiated with the electromagnetic radiation emitted by the fuser 118.

At block 208, the fusing agent may absorb the electromagnetic radiation emitted by the fuser 118. In absorbing the electromagnetic radiation emitted by the fuser 118, the temperature of the fusing agent increases. Heat from the fusing agent is transmitted, for example by conduction, to particulate material in the substrate 114 in the vicinity of the fusing agent. The temperature of the particulate material of the substrate 114 in the vicinity of the fusing agent thereby also increases.

At block 210, the temperature of the particulate material of the substrate 114 in the vicinity of the fusing agent reaches a temperature sufficient for the particulate material to melt, sinter or otherwise fuse together. At this point the fuser 118 may cease emitting electromagnetic radiation.

At block 212, the method 200 may return to block 202 and a second layer of particulate material may be provided over the first layer of substrate 114a, to form the second layer of substrate 114b. The method may continue for plural iterations. In each iteration, the fusing agent may be applied in a pattern determined so as to define layers of the three-dimensional object 110.

Figure 3:
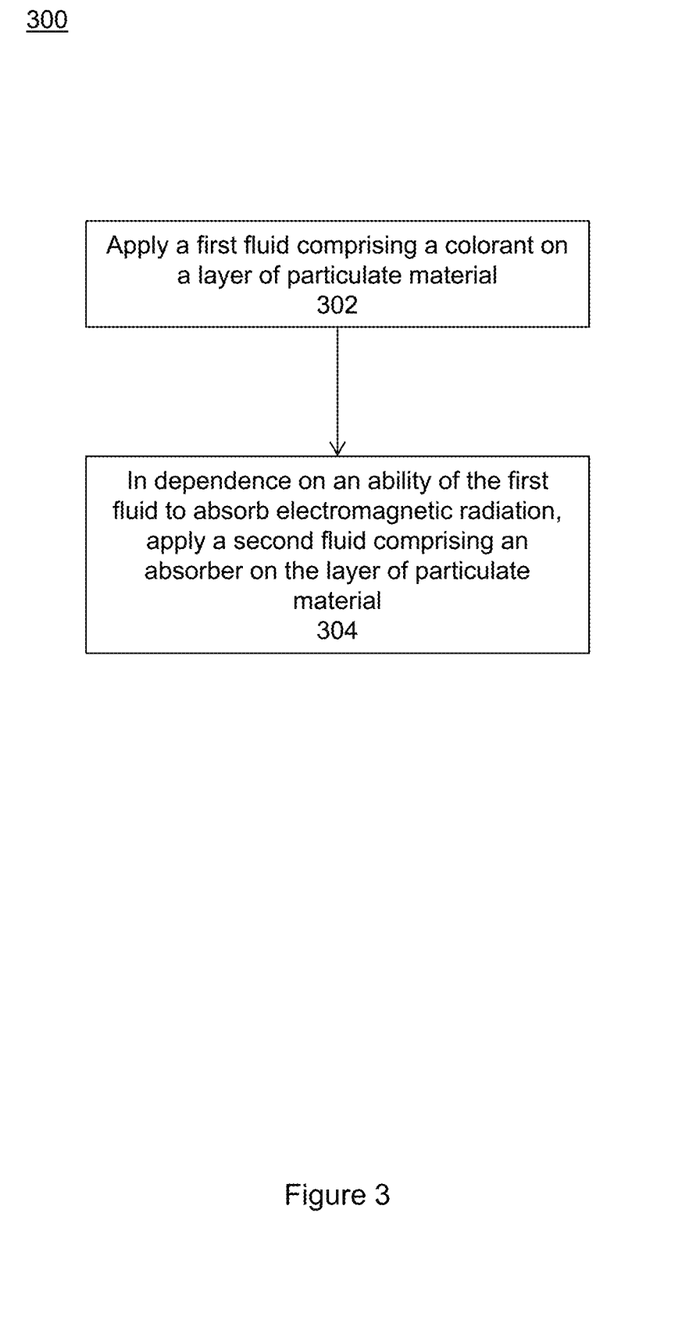
FIG. 3 is a flow diagram showing a method of producing a three-dimensional object according to an example.

FIG. 3 shows a method 300 of producing a three-dimensional object 110. This method may be implemented, for example, by the processor 106 of FIG. 1. Alternatively, the method may be implemented by another processor in the apparatus 100, or may be implemented by a processor of a computing device sending instructions to the apparatus 100.

At block 302, a first fluid is applied on a layer of particulate material. The first fluid comprises a colorant.

At block 304, a second fluid is applied on the layer of particulate material, the second fluid comprising an absorber to absorb electromagnetic radiation. The application of the second fluid is dependent on an ability of the first fluid to absorb the electromagnetic radiation.

Blocks 302 and 304 may be performed in any order or may be performed simultaneously, in different examples.

In some examples, the particulate material weakly absorbs electromagnetic radiation having a wavelength in the range of wavelengths emitted by the fuser 118.

The colorant of the first fluid may comprise organic pigment, inorganic pigment, organic dye, thermochromic dye such as leuco dye, or the like. In some examples, the colorant has a decomposition temperature greater than 250° C. In some examples, the colorant has a decomposition temperature greater than 300° C. This may help prevent the color of the three-dimensional object being adversely effected by the increased temperature for fusion.

The colorant may be part of a full color space which may be applied to the three-dimensional object. For example, the colorant may form part of a four color model, such as the CMYK (cyan, magenta, yellow and key) model, or the like.

The absorber of the second fluid may comprise a photon-absorbing additive. Such an additive helps reduce the energy needed to increase the temperature of an exposed voxel to the melting point of the powder forming the substrate 114. This may increase the efficiency of the apparatus and/or reduce the carbon footprint of the fabrication method. In some examples, the absorber may be a near infrared dye (NIRD) or a near infrared pigment (NIRP). Such absorbers may, for example, absorb electromagnetic radiation having wavelengths from about 800 nm to about 1400 nm, and convert the absorbed energy to thermal energy.

In some examples, heat dissipation may be suppressed in regions of the substrate 114 that are not to be fused. For example a fluid, referred to herein as a detailing agent, may be applied to regions of the substrate 114 that are not to be fused. In some examples, the detailing agent may evaporate when irradiated with electromagnetic radiation emitted by the fuser 118. Such evaporation may cool regions of the substrate 114 that are not to be fused. This may prevent the particulate material in regions close to the edges of the three-dimensional object 110 from fusing to the three-dimensional object 110. This may reduce undesired part growth and improve accuracy and surface finish of the three-dimensional object 110.

In some examples, the substrate 114 may be preheated to a temperature slightly below the temperature to fuse the particulate material. The energy provided by the electromagnetic radiation emitted by the fuser 118 may bring the particulate material in regions in the vicinity of the absorber to a temperature for fusion. The particulate material in these regions may then fuse, and quickly return to a temperature below the temperature for fusion after cessation of the emission of the electromagnetic radiation. For a semi-crystalline polymer, the optimal pre-heat temperature may be slightly below the melting temperature of the polymer.

Preheating the substrate 114 may minimize shrinkage that may otherwise occur during cooling and re-crystallization. By controlling the rate of crystallization, parts can be produced with improved dimensional accuracy and reduced risk of distortion.

Figure 4:
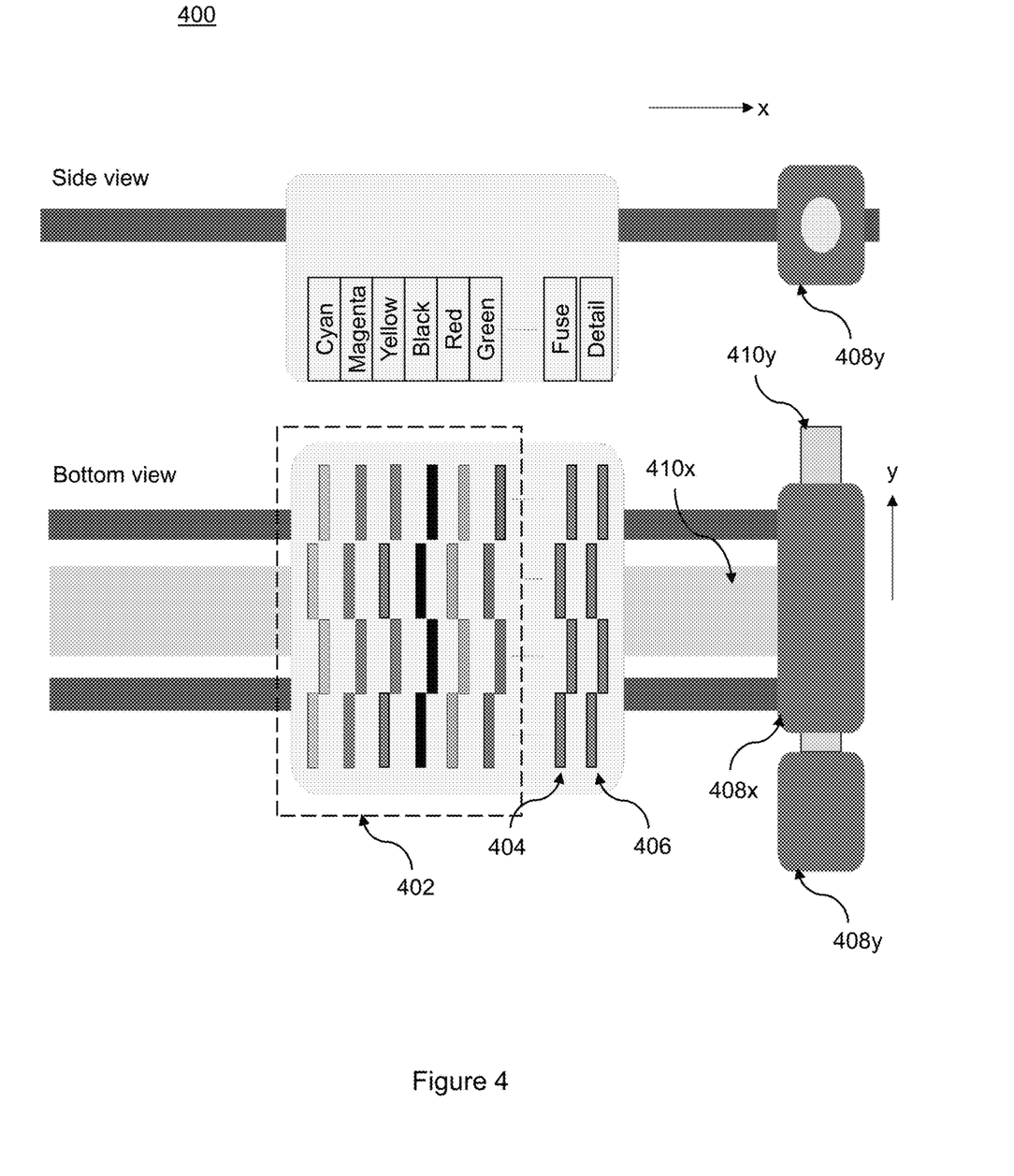
FIG. 4 is a schematic diagram of a print head assembly for producing a three-dimensional object according to an example.

FIG. 4 is a schematic diagram showing side and bottom views of an example of a print head assembly 400. In the example, the print head assembly 400 is a thermal print head assembly comprising dies for jetting CMYK colorants, the fusing agent, and the detailing agent. In particular, the print head assembly 400 of this example comprises plural colorant print heads 402 for dispensing fluid comprising a colorant, a fusing agent print head 404 for dispensing fusing agent (comprising an absorber), and a detailing print head 406 for dispensing detailing agent.

The colorant print heads 402 shown in FIG. 4 may include print heads for dispensing cyan, magenta, yellow, black (key), red and green printing fluids. In some examples other printing fluids may be dispensed. For example, more or fewer colorant print heads 402 may be included in the print head assembly 400. In some examples, other printing fluids than those described above may be dispensed, such as, for example, fluorescent printing fluids, gloss enhancers, gloss modifiers, or the like.

The print head assembly 400 may comprise a translation system, comprising an x-direction translation mechanism and a y-direction translation mechanism, for causing relative movement of the print heads 402 and a build area. Each of the x- and y-direction translation mechanisms may comprise, for example, a translation motor 408x, 408y and a translation belt 410x, 410y. In other examples, other mechanisms for providing relative movement of the print heads 402 and the build area may be provided. In some examples, one or other of the x- and y-direction translation mechanisms may be omitted, such as in examples where the print head assembly 400 is a "page-wide array" print head assembly. A page-wide array print head may be used to increase the throughput of the apparatus 100.

In some examples, the print head assembly 400 comprises a z-direction translation mechanism (not shown). For example, the z-direction translation mechanism may provide that the print heads 402, 404, 406 can be in close proximity to the substrate 114 while dispensing. In some examples, the print heads 402, 404, 406 may be substantially maintained at a distance of 0.25 mm to 3 mm from an uppermost surface of the substrate 114. The print head assembly 400 may be driven in a raster scan motion over the substrate 114, so that the substrate 114 is passed by the print head assembly 400 at least once. Multiple passes of the print head assembly 400 may be executed.

In some examples, the print head assembly 400 may not include any translation mechanisms. For example, the print head assembly 400 may be fixed and stationary and the platen 108 or build area 102 may instead be translated in relation to the print head assembly 400.

In some examples, the print head assembly may include a thermal shield (not shown) around the print heads 402, 404, 406. Such a thermal shield may help to prevent overheating of the print heads 402, 404, 406 during operation, thereby improving the reliability of the print heads 402, 404,

406. Additionally or alternatively, thermal shutters can be implemented to cap a nozzle that is not being used at a given point in the production process. In some examples, printing fluids may be circulated out of the print heads 402, 404, 406 so that the printing fluids achieve thermal equilibrium. This may facilitate stable dispersion.

In some examples, the print head assembly 400 may be cooled. In some examples, the temperature of the print head assembly 400 may be monitored by a thermal sensor (not shown) during operation, and the temperature of the print head assembly 400 may be controlled based on the temperature indicated by the thermal sensor.

In some examples, a temperature sensing system may be used to obtain a thermal map of the substrate 114 to provide feedback to the fuser 118, thus enabling the fuser 118 to be controlled to provide adjustment of the radiation the fuser 118 is emitting. This may facilitate compensation for shrinkage, and/or improve fusing uniformity. In some examples, parallel or serial segmented exposures may be implemented with feedback based on the thermal map. This may help improve fusing uniformity.

In some examples, a non-colored or neutrally-colored absorber may be included in the colorant and be dispensed directly with the colorant. The amount of non-colored absorber included may be dependent on an ability of the first fluid to absorb the electromagnetic radiation. In such examples, the fusing print head 404 may be omitted from the print head assembly 400. In such examples, variation of the mechanical properties of a three-dimensional object that would otherwise be caused by including different colorant can be compensated using the non-colored or neutrally-colored absorber.

In additive manufacturing approaches that recycle unused build material for subsequent uses, it may be desirable to minimize or prevent contamination of unfused material with colorant so that the unfused material can be recycled. Color-contamination may limit the reuse of un-molten powder for subsequent builds, increasing material waste and the cost of the final part, making the system impractical. In order to minimize contamination, various deposition strategies may be employed, as described below with reference to FIGS. 5 to 8.

In FIGS. 5 to 8, droplets or discrete volumes of printing fluid are represented by circles. Unshaded circles represent droplets or discrete volumes of non-colored or neutrally-colored printing fluid. Shaded circles represent droplets or discrete volumes of printing fluid comprising colorant.

Figure 5:
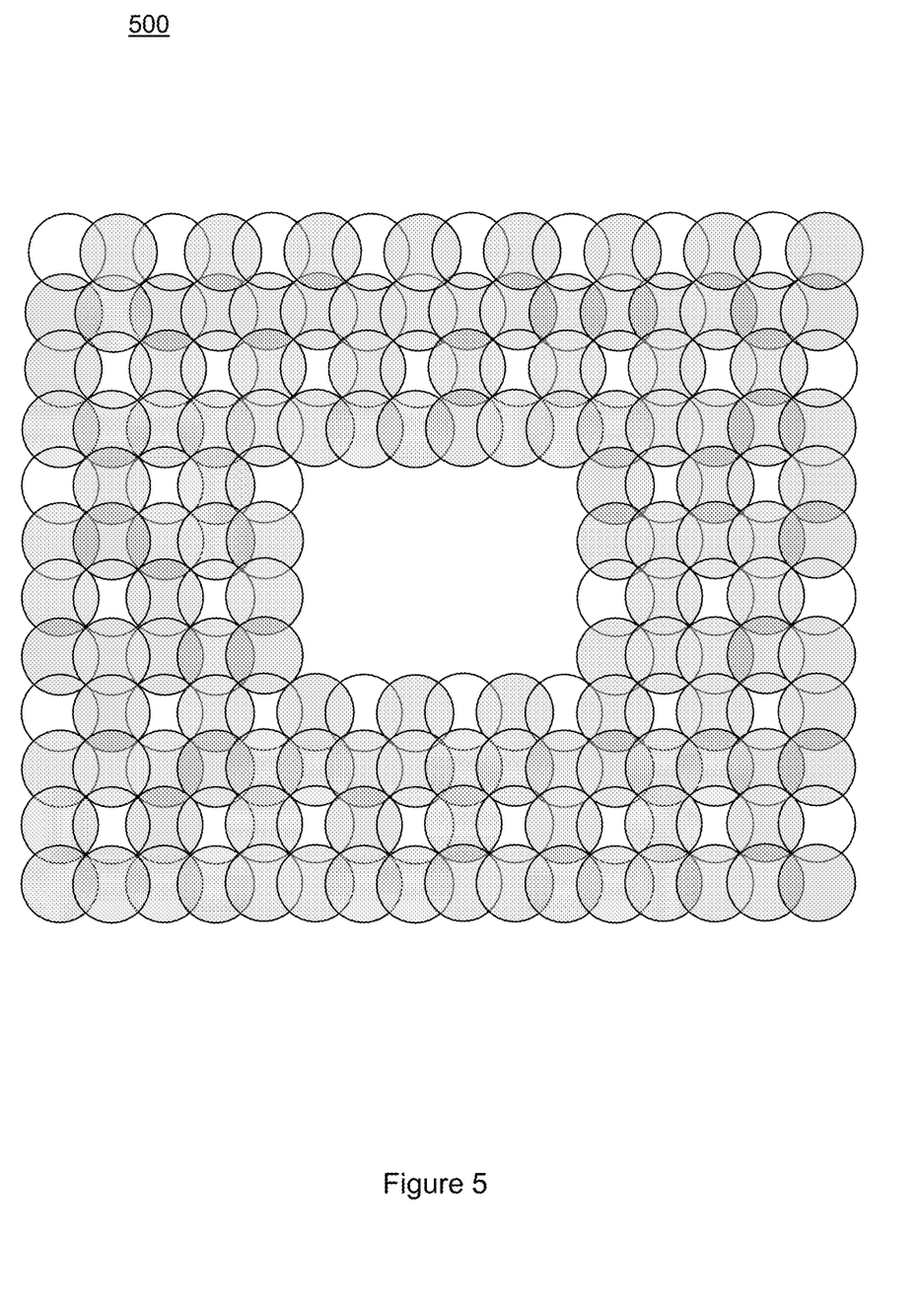
FIG. 5 is a schematic diagram showing a strategy for dispensing fluids according to an example.

FIG. 5 shows a schematic representation of a deposition strategy according to an example. In the example of FIG. 5, droplets of colorant are interspersed with droplets of non-colored or neutrally-colored printing fluid. The result is that the printed part is colored throughout its structure. However, by varying the relative amount of non-colored or neutrally-colored absorber printing fluid to colorant, the mechanical properties and color of the three-dimensional object may be varied separately.

As discussed above, additionally or alternatively, the amount or volume of non-colored or neutrally-colored absorber dispensed may be varied according to an ability of the colorant to absorb electromagnetic radiation. For example, the amount of non-colored or neutrally-colored absorber may be greater for colorants that weakly absorb the electromagnetic radiation emitted by the fuser 118, as compared with colorants that more strongly absorb the electromagnetic radiation emitted by the fuser 118.

In an example, such a deposition strategy may be implemented using a print head assembly 400 with six print heads (or "trenches"). One trench may be used for each of the CMYK colorants, one trench may be used for a non-colored or neutrally-colored absorbing fusing agent, and, one trench may be used for a detailing agent.

Figure 6:
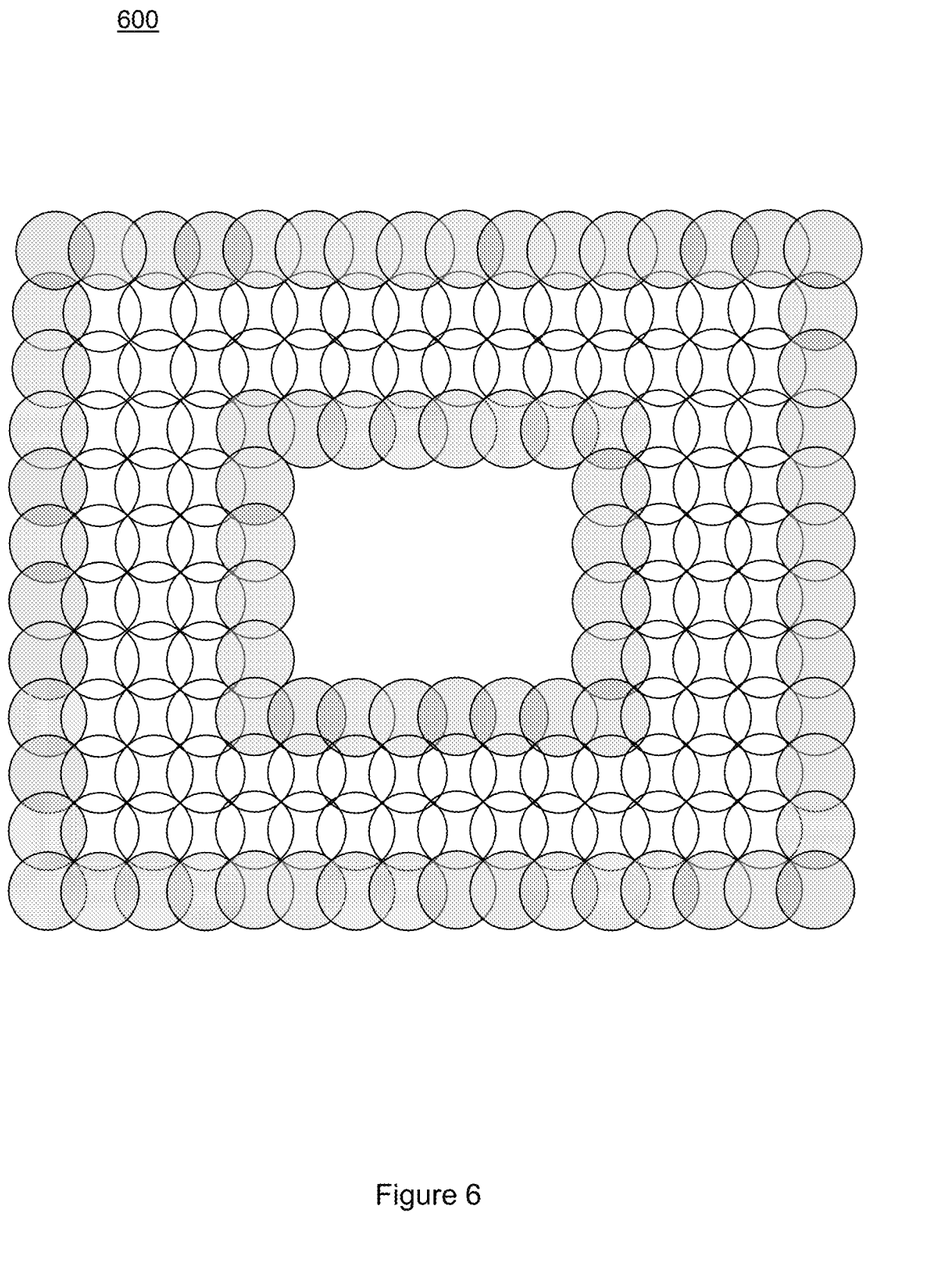
FIG. 6 is a schematic diagram showing a strategy for dispensing fluids according to an example.

FIG. 6 is a schematic representation of a deposition strategy according to another example. In this example, non-colored or neutrally-colored absorber is deposited on internal portions of the three-dimensional object 600 (those in the "core" of the object), and colorant is applied to the outer surface (the "shell") of the object 110. Since, the majority of the three-dimensional object 600 is formed by heat absorbed by the absorber, and a relatively small amount of the part is formed by the action of colorant absorbing electromagnetic radiation, the mechanical properties of the three-dimensional object 600 are less susceptible to changes in the ability of the colorant to absorb the electromagnetic radiation. The thickness of the shell may be varied according to the desired appearance of the three-dimensional object 600. For example, the thickness of the shell may be between about 100 microns and about 500 microns.

Figure 7:
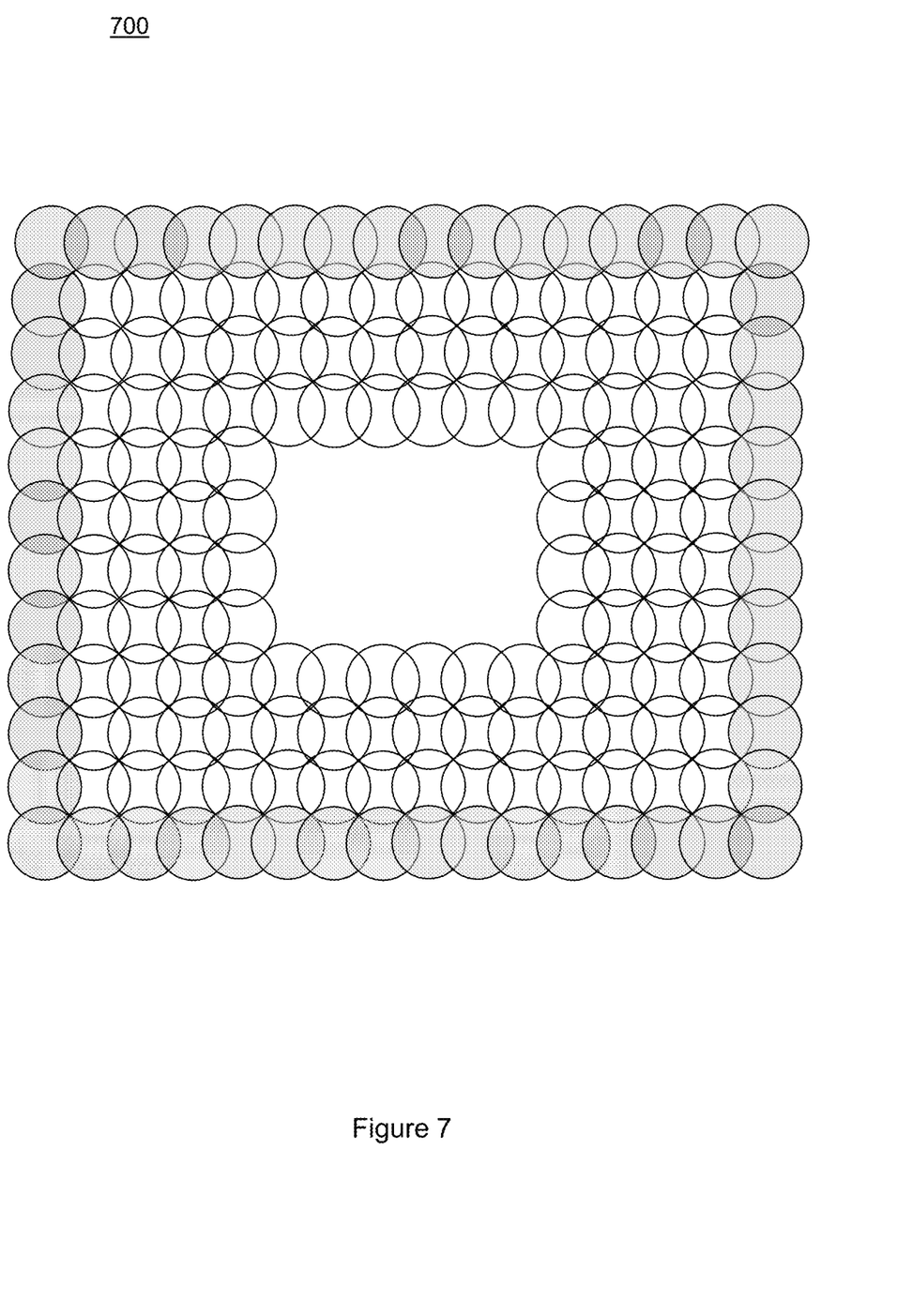
FIG. 7 is a schematic diagram showing a strategy for dispensing fluids according to an example.

FIG. 7 is a schematic representation of a deposition strategy similar to that shown in FIG. 6. However, in the strategy depicted in FIG. 7, just the visible external surfaces of the three-dimensional object 700 are colored.

Figure 8:
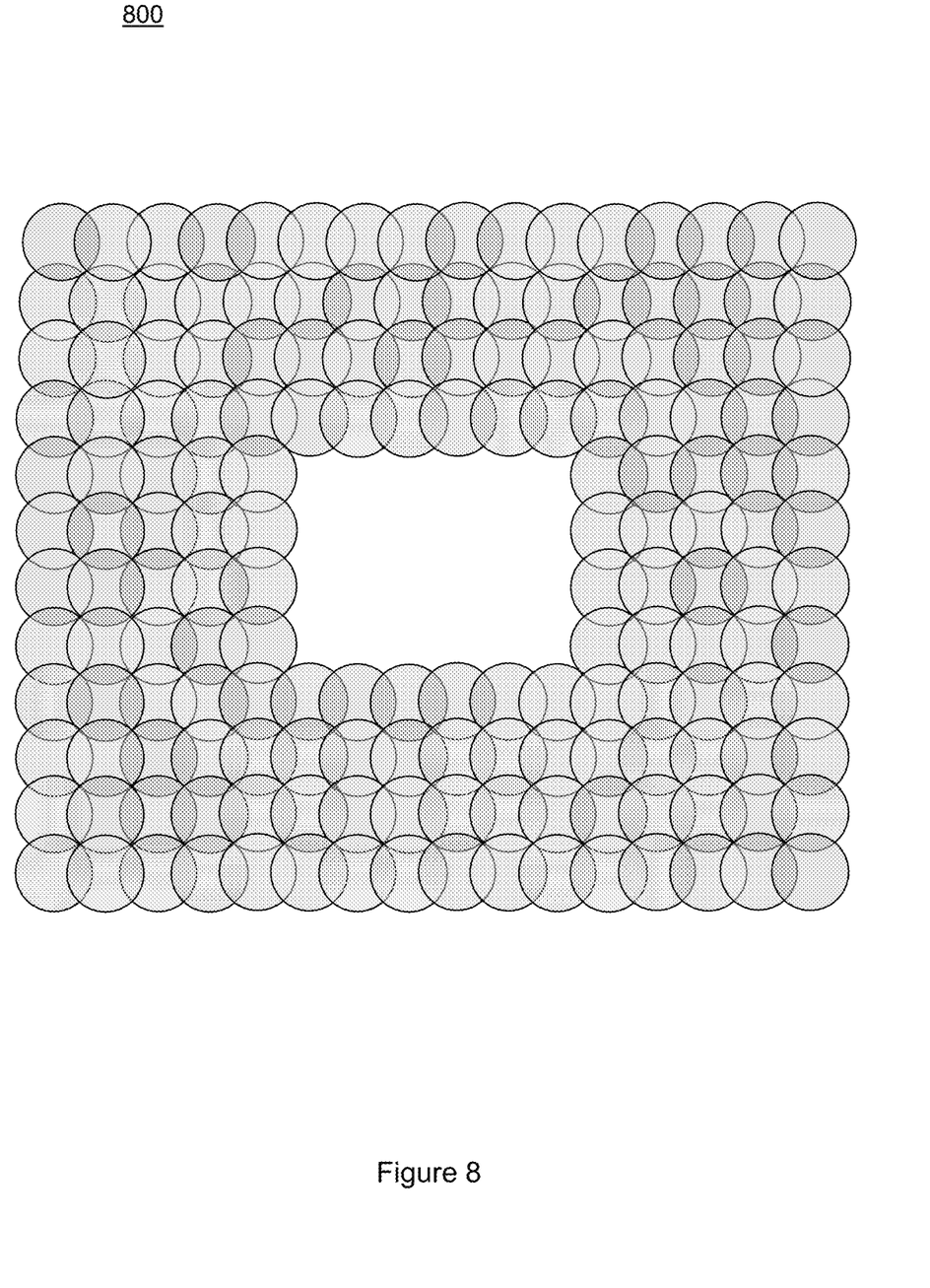
FIG. 8 is a schematic diagram showing a strategy for dispensing fluids according to an example.

FIG. 8 is a schematic representation of a deposition strategy which may be used when the absorber is included in the printing fluid containing colorant. In this example, the printing fluid comprising the colorant and the absorber is uniformly deposited throughout the three-dimensional object 800.

In certain examples, the processor 106 may use a combination of strategies depending on the desired color properties and mechanical properties of the three-dimensional object being produced.

In some examples, printing fluids dispensed by the apparatus 100 may include other fluids, such as water, dispersants to provide a stable dispersion and improve "jetting" performance, surfactants to control the wetting behavior of droplets of printing fluid (so as to ensure that the droplets penetrate through the substrate 114), co-solvents (such as aliphatic alcohols, aromatic alcohols, diols, glycol ethers, polyglycol ethers, caprolactams, formamides, acetamides, and long chain alcohols) to provide good deposition of printing fluids in examples where the print head is out of a capping station, so that evaporation of printing fluid may lead to changes in printing fluid viscosity (so-called "decap" performance), and examples where debris may form on the print head, which may lead to changes in droplet weight and/or droplet velocity (so-called "decel" performance), and the like. In some examples, the printing fluid may include a UV marker which provides a means for alignment of x-y image planes, and may provide a means to authenticate a produced three-dimensional object 110.

The examples described above in which the amount of colorless or neutrally-colored absorber may be controlled may facilitate control of the mechanical properties and color of a three-dimensional object and may facilitate compensation for variation of the mechanical properties of a three-dimensional object that would otherwise be caused by including different colorant. For example, the examples described above may facilitate the formation of a multi-colored three-dimensional object with mechanical properties that are substantially uniform throughout the object. That is, the mechanical properties may not be color dependent. Alternatively or additionally, control of the amount of colorless or neutrally-colored absorber may facilitate variation in the mechanical properties of a colored three-dimensional object 110. That is, different portions of the object may have different respective mechanical properties.

Any feature described in relation to any one example may be used alone, or in combination with other features described, and may also be used in combination with a feature or features of any other of the examples, or any combination of any other of the examples. Furthermore, equivalents and modifications not described above may also be employed.

What is claimed is:

1. An apparatus to produce a three-dimensional object, the apparatus comprising:
    a dispensing apparatus; and
    a processor to:
        determine an amount of a first fluid that the dispensing apparatus is to apply on a region of a layer of particulate material, the first fluid comprising a colorant;
        identify an ability of the first fluid to absorb electromagnetic radiation; and
        determine an amount of a second fluid that the dispensing apparatus is to apply on the region of the layer of particulate material and become interspersed with the first fluid applied on the region of the layer of particulate material, the second fluid comprising an absorber to absorb the electromagnetic radiation, wherein the processor is to determine the amount of the second fluid that the dispensing apparatus is to apply to the region of the layer of particulate material in dependence on the identified ability of the first fluid to absorb the electromagnetic radiation.

2. The apparatus according to claim 1, wherein the processor is to control the dispensing apparatus to apply the determined amount of the second fluid to the layer of particulate material.

3. The apparatus according to claim 1, wherein the processor is to select the second fluid from a plurality of fluids that have different respective electromagnetic absorption characteristics in dependence on the ability of the first fluid to absorb the electromagnetic radiation.

4. An apparatus to produce a three-dimensional object, the apparatus comprising:
    a dispensing apparatus to dispense a first fluid and a second fluid on a layer of particulate material, the first fluid comprising a colorant and the second fluid comprising an absorber to absorb electromagnetic radiation; and
    a processor to:
        control the dispensing apparatus to dispense an amount of the first fluid on a region of the layer of particulate material; and
        control the dispensing apparatus to dispense an amount of the second fluid on the region of the layer of particulate material based on an electromagnetic radiation absorption characteristic of the first fluid to become interspersed with the first fluid dispensed on the region of the layer of particulate material.

5. The apparatus according to claim 4, further comprising an electromagnetic radiation source to emit electromagnetic radiation having a wavelength corresponding to a wavelength at which the absorber absorbs electromagnetic radiation and converts absorbed electromagnetic radiation into thermal energy.

6. The apparatus according to claim 4, further comprising a supply mechanism to provide the layer of particulate material.

7. The apparatus according to claim 4, wherein the dispensing apparatus comprises first and second dispensers, wherein the first dispenser is to dispense the first fluid, and the second dispenser is to dispense the second fluid.

8. The apparatus according to claim 4, wherein the dispensing apparatus is to dispense one of plural colorants, and the processor is to control the dispensing apparatus to dispense an amount of the second fluid based on a color of the dispensed one of the plural colorants.

9. The apparatus according to claim 1, wherein the processor is to identify the ability of the first fluid to absorb electromagnetic radiation based on a color of the colorant comprised in the first fluid.

* * * * *